United States Patent
Miyaji

(10) Patent No.: US 9,599,969 B2
(45) Date of Patent: Mar. 21, 2017

(54) POSITION CONTROL APPARATUS

(71) Applicant: OKUMA Corporation, Niwa-gun, Aichi (JP)

(72) Inventor: Masashi Miyaji, Aichi (JP)

(73) Assignee: OKUMA CORPORATION (JP)

( * ) Notice: Subject to any disclaimer, the term of this patent is extended or adjusted under 35 U.S.C. 154(b) by 308 days.

(21) Appl. No.: 14/174,957

(22) Filed: Feb. 7, 2014

(65) Prior Publication Data

US 2014/0217952 A1    Aug. 7, 2014

(30) Foreign Application Priority Data

Feb. 7, 2013  (JP) ................................. 2013-021990

(51) Int. Cl.
| | |
|---|---|
| *G05B 5/01* | (2006.01) |
| *G05B 19/404* | (2006.01) |
| *G05D 3/12* | (2006.01) |

(52) U.S. Cl.
CPC ............ *G05B 5/01* (2013.01); *G05B 19/404* (2013.01); *G05B 2219/49054* (2013.01); *G05B 2219/49176* (2013.01)

(58) Field of Classification Search
USPC ....................................................... 318/611
See application file for complete search history.

(56) References Cited

U.S. PATENT DOCUMENTS

| | | | | | |
|---|---|---|---|---|---|
| 4,448,077 | A | * | 5/1984 | Sato ....................... | G01H 1/003 340/683 |
| 4,453,407 | A | * | 6/1984 | Sato ....................... | G01H 1/003 702/56 |
| 8,560,129 | B2 | * | 10/2013 | Moriya .................. | G05D 19/02 700/280 |

(Continued)

FOREIGN PATENT DOCUMENTS

| | | |
|---|---|---|
| JP | 2004-120963 A | 4/2004 |
| JP | 2009-44947 A | 2/2009 |
| JP | 2012-168926 A | 9/2012 |

OTHER PUBLICATIONS

Office Action Issued Aug. 30, 2016 for Japanese Patent Application JP 2013-021990. 7 pages.

*Primary Examiner* — Eduardo Colon Santana
*Assistant Examiner* — Said Bouziane
(74) *Attorney, Agent, or Firm* — McCarter & English, LLP

(57) ABSTRACT

A position control apparatus is configured to perform full-closed control for controlling the position of a driven member. The position control apparatus includes a vibration period and amplitude detector that detects a vibration period and a vibration amplitude included in a difference value between the position command value and the driven member position detection value. The position control apparatus also includes a constant vibration detector that outputs, as a vibration period of the constant vibration, a vibration period obtained while the driven member is not in an acceleration/

(Continued)

deceleration state and the vibration period and the vibration amplitude detected by the vibration period and amplitude detector are equal to or greater than a vibration period threshold value and a vibration amplitude threshold value, respectively. The position control apparatus also includes a control parameter changer that changes the control parameter based on the vibration period output from the constant vibration detector.

9 Claims, 11 Drawing Sheets

(56) References Cited

U.S. PATENT DOCUMENTS

| | | | | |
|---|---|---|---|---|
| 8,878,479 B2* | 11/2014 | Ueda | ............ | B29C 45/77 |
| | | | | 318/560 |
| 2001/0033146 A1* | 10/2001 | Kato | ............ | B25J 9/1641 |
| | | | | 318/568.22 |
| 2008/0143287 A1* | 6/2008 | Sato | ............ | G05B 5/01 |
| | | | | 318/611 |
| 2009/0009128 A1* | 1/2009 | Okita | ............ | G05B 13/024 |
| | | | | 318/619 |
| 2010/0295497 A1* | 11/2010 | Takamatsu | ............ | H02P 23/0004 |
| | | | | 318/671 |
| 2011/0066292 A1* | 3/2011 | Moriya | ............ | G05D 19/02 |
| | | | | 700/280 |
| 2012/0130693 A1* | 5/2012 | Ertas | ............ | E21B 44/00 |
| | | | | 703/2 |
| 2012/0194121 A1* | 8/2012 | Miyaji | ............ | G05B 19/404 |
| | | | | 318/615 |

* cited by examiner

POSITION CONTROL APPARATUS

CROSS-REFERENCE TO RELATED APPLICATION

This application claims priority to Japanese Patent Application No. 2013-021990, filed on Feb. 7, 2013, which is incorporated herein by reference in its entirety.

FIELD OF THE INVENTION

The present invention relates to a position control apparatus for a feed-axis (i.e., a driven member, such as a table, a saddle, or a spindle head) of a machine tool or the like. More specifically, the present invention relates to an improved position control apparatus capable of realizing full-closed control in controlling the position of a driven member based on a position command value.

BACKGROUND OF THE INVENTION

The following conventional techniques have been adopted in an attempt to reduce a position error in a position control apparatus that includes a linear scale attached to a movable portion of a machine tool to detect the position of a driven member and performs full-closed control based on a comparison between a detected driven member position and a position command value.

To reduce the position error in a transient response, it is useful to set the gain of a speed loop and the gain of a position loop to higher values. In this case, the driven member can be accurately controlled in such a way as to reduce adverse influence of an unpredictable load change or disturbance, such as a change in sliding friction of the movable portion or a cutting load.

FIG. 7 is a block diagram illustrating a general full-closed control system. A linear scale 11 directly detects the position of a driven member 12 and generates a position detection value Pl that represents the position of the driven member 12. A subtractor 2 receives the position detection value Pl as a position feedback value, and calculates a deviation Pdif of the position detection value Pl relative to a position command Pc. A speed command calculator 3 multiplies the position deviation Pdif by a proportional gain Kp, and outputs a multiplication result as a speed command Vc. Meanwhile, a motor position detector 9 is attached to a motor 10 that drives the driven member 12, and generates a position detection value Pm. A differentiator 14 differentiates the position detection value Pm and outputs a differentiation result as a motor speed detection value Vm. A subtractor 4 obtains a deviation of the motor speed detection value Vm relative to the speed command Vc and outputs the obtained deviation as a speed deviation. A torque command calculator 5 multiplies the speed deviation by a speed loop proportional gain Pv, and outputs a multiplication result as a speed deviation proportional component. Meanwhile, a torque command calculator 6 multiplies an integrated value of the speed deviation by a speed loop integrated gain Iv, and outputs a multiplication result as a speed deviation integral component. An adder 7 adds the speed deviation proportional component and the speed deviation integral component, and outputs an addition result as a torque command Tc. A portion 8 illustrated in FIG. 7 includes various filters capable of filtering the torque command, and a current control unit. The current control unit functions as a driving unit that controls the motor 10 in response to the torque command Tc, and drives the driven member 12 via a ball screw 13.

It is assumed herein that the transfer characteristic of the various filters and the current control unit, which are represented by the reference numeral 8 in FIG. 7, is equal to 1 and the driven member is connected to the motor via a spring having a spring coefficient Kb. It is also assumed that the motor and the driven member 12 have motor-shaft-converted inertia Jm and Jl and viscous friction coefficients Dm and Dl, respectively. In this case, a simplified model is provided as illustrated in the block diagram of FIG. 8, which shows the transfer characteristic from the torque command Tc to the position detection value Pl of the driven member.

In FIG. 8, a simplified model is provided based on an assumption that Vm represents the motor speed detection value and S represents a Laplacian operator. In this case, a sum of the motor acceleration torque $Jm \cdot S \cdot Vm$, the motor viscous friction $Dm \cdot Vm$ and a counterforce torque Tr the torque command Tc. It is expressed in this model that the speed detection value Vm of the motor is obtained when a difference between the torque command Tc and the counterforce torque Tr is put in a motor model 16. In addition, an integrator 17 integrates the motor speed detection value Vm to generate the motor position detection value Pm to be input to a spring-based model 18.

In the spring-based model 18, a difference between the motor position detection value Pm and the position detection value Pl of the driven member is calculated, and the calculated difference is multiplied by a spring constant Kb of a spring model 20 to generate a transfer torque to be transferred to the driven member. The transfer torque to the driven member is equal to the counter force torque Tr from the driven member, and a simplified model is provided when Vl represents a speed detection value of the driven member. In this case, the transfer torque equals a total sum of an acceleration torque $Jl \cdot S \cdot Vl$ of the driven member and a viscous friction $Dl \cdot Vl$ of the driven member. FIG. 8 illustrates that a driven member model 21 receives the transfer torque to the driven member to provide the speed detection value Vl. Further, an integrator 22 integrates the speed detection value Vl of the driven member to provide the position detection value Pl of the driven member.

In FIG. 7, it is assumed that the transfer characteristic from the speed command Vc to the motor speed detection value Vm equals 1. That is, a responsive band of the speed feedback control system is high enough to configure the control system so that it is capable of suppressing an influence of the counter force torque Tr from the driven member in FIG. 8. The block diagram of FIG. 7 may be replaced by the block diagram of FIG. 9.

More specifically, the transfer characteristic of the motor speed detection value Vm from the speed command Vc can be replaced by 1, as indicated by reference numeral 23. Further, the integrator 17 integrates the motor speed detection value Vm to provide the motor position detection value Pm, as in the structure of FIG. 8. The spring-based model 18 receives as an input the motor position detection value Pm and outputs the position detection value Pl of the driven member. In this case, a transfer function of the entire control system is expressed by the following formula (1). In formula (1), S represents a Laplacian operator.

$$Pl(S)/Pc(S) = Kp \cdot Kb / (Jl \cdot S^3 + D1 \cdot S^2 + Kb \cdot S + Kp \cdot Kb) \quad \text{formula (1)}$$

If a condition $Kp \ll (Kb/Jl)^{1/2}$ is applied to the above formula, a gain diagram representing a characteristic of the entire control system is obtained as illustrated in FIG. 13.

Recent developments in various filtering techniques or damping controls and introduction of improved speed loops have enabled setting of high values in position/speed loop gain setting. However, the rigidity of a working part of the feed-axis may decrease due to aging (e.g., frictional wear and looseness) of a component that constitutes a driving mechanism, or due to reduction in tensile strength of a ball screw that is derived from expansion of the ball screw, which may occur when the temperature increases during a continuous operation. In this case, the mechanical resonance frequency $(Kb/Jl)^{1/2}$ decreases, and the gain characteristic of the entire control system defined by formula (1) is as illustrated in FIG. 14. More specifically, a gain margin of the mechanical resonance frequency $(Kb/Jl)^{1/2}$ decreases due to high setting of the position loop gain. In some cases, a driven member may vibrate at low frequencies. Further, in a large-scale machining center or the like, the mechanical resonance frequency $(Kb/Jl)^{1/2}$ decreases if a workpiece mounted on a driven member is heavier than expected. Therefore, low frequency vibrations occur similarly. To solve the above-described problem, the following technique is conventionally available.

FIGS. 10 and 11 are control block diagrams illustrating conventional techniques directed to suppress low frequency vibrations. Components similar to those illustrated in FIG. 7 are denoted by the same reference numerals and descriptions thereof are not repeated. An aging corrector 40 illustrated in the drawings will be described in detail below.

In FIG. 10, a position detection value calculator 27 outputs a position feedback value Pd, which represents the position defined by formula (2) below including the driven member position detection value Pl and the motor position detection value Pm. In formula (2), Tp represents a time constant of a first-order delay circuit 25 and S represents a Laplacian operator.

$$Pd=Pm+(Pl-Pm)/(1+Tp \cdot S) \qquad \text{formula (2)}$$

In formula (2), $1/(1+Tp \cdot S)$ represents the first-order delay circuit, and the first-order delay circuit 25 illustrated in FIG. 10 calculates the second term of formula (2).

In FIG. 11, a speed detection value calculator 32 outputs a speed feedback value Vd which represents speed defined by the following formula (3) including the driven member position detection value Vl which has been obtained in the differentiator 28 by differentiating the driven member position detection value Pl, and the motor speed detection value Vm. In formula (3), Tv represents a time constant of a first-delay circuit 30 and S represents a Laplacian operator.

$$Vd=Vm+(Vl-Vm)/(1+Tv \cdot S) \qquad \text{formula (3)}$$

In formula (3), $1/(1+Tv \cdot S)$ represents the first-order delay circuit, and the first-order delay circuit 30 illustrated in FIG. 11 calculates the second term of formula (3).

Next, the aging corrector 40 will be described. The aging corrector 40 receives as inputs the position command Pc and the driven member position detection value Pl, and detects the vibration of the driven member while the driving mechanism is not in the acceleration/deceleration state. Upon detection of the vibration of the driven member, the aging corrector 40 increases the time constants Tp and Tv of the first-order delay circuits 25 and 30, respectively. Alternatively, the aging corrector 40 decreases the gain Kp of the speed command calculator 3, the speed loop proportional gain Pv of the torque command calculator 5, or the speed loop integral gain Iv of the torque command calculator 6.

A dotted line in FIG. 15 indicates a gain characteristic of the entire control system illustrated in block diagrams of FIGS. 10 and 11 in the case where the values of Tp and Tv become larger under condition of $Tp>>(Kb/M)^{1/2}$ and $Tv>>(Kb/M)^{1/2}$ in formula (2) and (3). In this case, the gain margin in the mechanical resonance frequency $(Kb/M)^{1/2}$ increases. Further, a solid line in FIG. 13 indicates a gain characteristic of the entire control system in the case where the rigidity of a working part of the feed-axis is reduced. Thus, the problem of low frequency vibrations occurring in the conventional example illustrated in FIG. 7 has been solved.

A solid line in FIG. 16 indicates a gain characteristic of the entire control system illustrated in FIGS. 10 and 11 in the case where the gain Kp of the speed command calculator 3 is reduced while the rigidity of a working part of the feed-axis decreases. A resulting gain margin of the mechanical resonance frequency $(Kb/Jl)^{1/2}$ is larger, which is useful in solving the problem of low frequency vibrations having occurred in the conventional example illustrated in FIG. 7.

A structure of the aging corrector 40 is described. FIG. 12 is a control block diagram illustrating a structure of the aging corrector 40. The position command Pc is input to a second-order differentiator 41 and subjected to second-order differentiation to calculate an acceleration command Ac. A comparator 43 compares the calculated acceleration command Ac with a predetermined acceleration command threshold value Acref. If the acceleration command Ac is equal to or less than the acceleration command threshold value Acref, it is determined that the driving mechanism is not in the acceleration/deceleration state (i.e., is in a normal state) and a vibration detection starting signal is output to a vibration detector 48.

As another input in addition to the vibration detection starting signal, the vibration detector 48 also receives a driven member position error signal that represents a difference between the position command value Pc and the driven member position detection value Pl. The vibration detector 48 calculates, while the vibration detection starting signal is output, a vibration frequency fp of the vibration included in the driven member position error signal, by using a frequency analyzing method such as Discrete Fourier Transform (DFT) or Fast Fourier Transform (FFT). In this case, a detection range of the vibration frequency fp is limited to a predetermined range from "fst" to "fen." It is regarded that the vibration is present only when the magnitude (amplitude) of the vibration included in the driven member position error signal is larger than a predetermined constant value SPref, and the vibration frequency fp is then output.

A divider 49 calculates a vibration period as the reciprocal of the received vibration frequency fp and outputs an initial time constant value T0 based on the calculated vibration period. The calculated initial time constant value T0 is set as initial values of the time constants Tp and Tv to be used in the first-order delay circuit 25 or 30. If the vibration frequency fp is continuously detected by the vibration detector 48 even after the values of the time constants Tp and Tv have been updated, a counter 51 starts a count-up operation and adds a predetermined time constant increment ΔT to increase the values of the time constants Tp and Tv by the time constant increment ΔT.

When the vibration detector 48 outputs the vibration frequency fp, a gain conversion initial value setting unit 53 performs the following calculations to provide a gain conversion initial value Ks by using the received vibration frequency fp as an input. In the structure illustrated in FIG. 11, if $\{Iv/(Jm + Jl)\}^{1/2} > 2\pi fp$,
then $Ks = 2\pi fp / \{Iv/(Jm + Jl)\}^{1/2}$
In the structure illustrated in FIG. 10, if $Kp > 2\pi fp$, $Ks = 2\pi fp / Kp$.
Otherwise, $Ks = 1$ formula (4)

The calculated gain conversion initial value Ks is set as an initial value of the gain conversion value K. If the vibration frequency fp is continuously detected by the vibration detector 48 even after the value of the gain conversion value K has been updated, a counter 55 starts a count-up operation and reduces a predetermined gain decrement ΔK to decrease the gain conversion value K by the gain decrement ΔK. The gain conversion value K is subjected to limit processing in a gain output switcher 59 so that the gain conversion value K falls within the range 0<K<1. Once the gain conversion value K is output, the speed command calculator 3 illustrated in FIG. 10 reduces the gain Kp to a value obtained by multiplying the original setting value of the gain Kp by the gain conversion value K. In the case of the structure illustrated in FIG. 11, the speed command calculator 3 reduces the gain Kp, the torque command calculator 5 reduces the speed loop proportional gain Pv, and the torque command calculator 6 reduces the speed loop integral gain Iv by multiplying original values thereof by the gain conversion value K.

In the conventional example illustrated in FIG. 12, it is feasible to prioritize the update of the time constants Tp and Tv rather than the update of the gain conversion value K in the gain output changer 59. More specifically, a comparator 58 compares the time constants Tp and Tv with a predetermined permissible time constant Tref. As a result of the comparison, if the time constants Tp and Tv exceed the permissible time constant Tref, the gain conversion value K is updated.

As described above, the aging corrector 40 illustrated in FIG. 12 can increase the time constants Tp and Tv of the first-order delay circuits 25 and 30 by a necessary amount. Alternatively, the aging corrector 40 can decrease the gain Kp of the speed command calculator 3, the speed loop proportional gain Pv of the torque command calculator 5, and the speed loop proportional gain Iv of the torque command calculator 6 by necessary amounts. Accordingly, it is feasible to solve the problem of low frequency vibrations having occurred in the conventional example illustrated in FIG. 7, while preventing an excessive gain margin from being secured and avoiding a significant decrease in responsiveness of the control system.

In the conventional technique illustrated in FIG. 12, the vibration frequency fp of the vibration included in the driven member position error signal is calculated using a frequency analyzing method such as DFT (FFT). In this case, however, there are problems such as (1) low calculation accuracy of the time constant due to inability to set a higher frequency resolution, (2) a large amount of memory usage, and (3) time-consuming tracing and analyzing of data.

For example, if an attempt is made to detect a low frequency vibration equivalent to 10 Hz in a system having a sampling period of 1 ms, a resulting frequency resolution will be 0.98 Hz in the case where the FFT calculation is performed for 1,024 sampling points. Resulting spectra correspond to 9.77 Hz and 10.74 Hz as spectra around 10 Hz. If these spectra are converted to vibration periods, however, resulting periods are 102.4 ms and 93.1 ms and a difference between the two is 9.3 ms. This is a very large difference relative to the 1 ms sampling period.

JP No. 2012-168926 A discloses that, assuming that the time constants Tp and Tv, which are changeable by the aging corrector 40, are also applicable to a moving average having a high-pass shielding characteristic (Finite Impulse Response (FIR) Filter), in addition to the first-order delay circuits 25 and 30, a moving average of Tp/Ts stage and a moving average of Tv/Ts stage are constituted for a sampling period Ts of the control system. In this case, however, the shielding characteristic of a corresponding frequency varies greatly depending on whether the time constants Tp and Tv are 102.4 ms or 93.1 ms.

To improve calculation accuracy of the time constant, it is useful to increase the sampling number. For example, spectra corresponding to 9.89 Hz and 10.01 Hz can be obtained by changing the sampling number to 8,192 points. If these spectra are converted to vibration periods, resulting periods are 101.1 ms and 99.9 ms. Thus, it is feasible to set the time constants Tp and Tv having a resolution equivalent to a 1 ms sampling period.

As the sampling number increases, an accompanying memory amount necessary for storing and analyzing data for sampling also increases. Further, it takes a long time to trace time-series data, as a series of data covering the sampling number×the sampling period are necessary. In addition to the increase of the time necessary for tracing, the time for performing a butterfly calculation in FFT also becomes longer due to an increase of the sampling number.

Meanwhile, JP 2012-168926 A also discloses another method of identifying the vibration frequency fp of the vibration included in the driven member position error signal. Using the method, a vibration period (initial time constant value T0) is detected as the reciprocal of the vibration frequency fp based on a time interval between the maximum value and the minimum value of the driven member position error signal.

In a transition process, however, of the vibration included in the position error signal where the vibration changes from the maximum value to the minimum value and vice versa, it is not always the case that monotone decreasing/increasing is repeated. For example, the vibration may frequently repeat increasing and decreasing due to the noise in the detector or the like and the length of the vibration amplitude may change for each vibration period. If the timing where the position error signal changes from increase to decrease is determined to be the maximum vibration value H and the timing where the position error signal changes from decrease to increase is determined to be the minimum vibration value, a vibration period greatly shorter than the true value of the period due to an influence of noise or the like should be detected. On the other hand, if the maximum value and the minimum value of the vibration are detected from among the time-series data including more than one period, a detected vibration period is greatly longer than the true value of the vibration period due to an influence of length change or the like.

Thus, if an attempt is made to identify the vibration period simply from the time interval between the maximum value and the minimum value of the time-series data, there is a problem that an erroneous vibration period may be detected.

Further, since a constant vibration occurs in a state where the rigidity of a working part of the feed-axis is reduced, it is necessary to suppress the vibration by updating the time constants Tp and Tv, or the gains Kp, Pv, and Iv. In contrast, these parameters need not be changed if the constant vibration is not occurring. In the conventional technique illustrated in FIG. 12, however, these parameters are forcibly changed even if an impulse-like disturbance is instantaneously applied. Thus, there is a problem that responsiveness of the control system is reduced due to change of the parameters and securing of an excessive gain margin.

A problem to be solved by the present invention is that a large amount of memory and a lot of time are required for accurately identifying the vibration frequency fp (time constant initial value T0) included in the driven member position error signal. Further, the vibration period (time constant initial value T0) is erroneously detected if an attempt is made to detect the vibration period from the time-series data due to an influence of noise of the detector or the like. Further, responsiveness of the control system is reduced due to change of the parameters (the time constants Tp and Tv, or the gains Kp, Pv, and Iv) and securing of an excessive gain margin when the impulse-like disturbance is applied instantaneously. An object of the present invention is to provide a position control apparatus that can accurately detect a low frequency vibration of a driven member and suppress the detected low frequency vibration without requiring a large amount of memory and a lot of time and without being affected by noise of a detector or the like. Another object of the present invention is to provide a position control apparatus that can minimize reduction in responsiveness of a control system without securing an excessive gain margin even if an impulse-like disturbance is applied.

SUMMARY OF THE INVENTION

According to the present invention, a position control apparatus includes a motor position detector and a driven member position detector capable of detecting a position of a driven member driven by a motor, and is configured to perform full-closed control for controlling the position of the driven member. The position control apparatus includes a speed command calculator that outputs a speed command value by proportionally amplifying a deviation between a position command value input from a host apparatus and a position feedback value. The position control apparatus includes a torque command calculator that outputs a torque command value by proportionally and integrally amplifying a deviation between the speed command value and a speed feedback value. The position control apparatus includes a driving unit that drives the motor in response to the torque command value. The position control apparatus includes an aging corrector that detects the presence or the absence of a constant vibration of the driven member based on the position command value and a driven member position detection value detected by the driven member position detector, calculates a vibration period of the constant vibration while the constant vibration occurs, and changes a control parameter in response to the vibration period. The aging corrector includes a vibration period and amplitude detector that detects an extreme value and timing of the extreme value of a difference value between the position command value and the driven member position detection value, and detects a vibration period and a vibration amplitude included in the difference value based on the detected extreme value and the timing of the extreme value. The aging corrector also includes an acceleration/deceleration state determiner that determines, based on the position command value, that the driven member is not in an acceleration/deceleration state. The aging corrector also includes a constant vibration detector that outputs, as a vibration period of the constant vibration, a vibration period obtained while the driven member is not in the acceleration/deceleration state and the vibration period and the vibration amplitude detected by the vibration period and amplitude detector are equal to or greater than a vibration period threshold value and a vibration amplitude threshold value, respectively. The aging corrector also includes a control parameter changer that changes the control parameter based on the vibration period output from the constant vibration detector.

In a preferred embodiment, the vibration period threshold value is obtained by reducing a predetermined threshold value from a maximum value of the vibration period detected by the vibration period and amplitude detector as a maximum value of the vibration period. In another preferred embodiment, the constant vibration detector performs a smoothing operation on the amplitude of the vibration detected by the vibration period and amplitude detector when the vibration period is equal to or greater than the vibration period threshold value, and determines whether the smoothed amplitude is equal to or greater than the vibration amplitude threshold value.

In another preferred embodiment, the position feedback value is a driven member position detection value detected by the driven member position detector. The speed feedback value is a motor speed detection value calculated by differentiating the position detection value obtained from the motor position detector. The control parameter changer includes a divider that calculates the vibration frequency of the constant vibration from the vibration period of the constant vibration, a gain conversion value output unit that uses as an initial value a gain conversion initial value calculated by the vibration frequency of the constant vibration, and sequentially outputs a gain conversion value obtained by repeatedly reducing a predetermined gain decrement each time the constant vibration is detected, and a gain output switcher that performs limit processing on the gain conversion value and changes a gain value by multiplying the gain setting value in the speed command calculator by the gain conversion value.

In another preferred embodiment, the position feedback value is a value obtained by adding the motor position detection value obtained from the motor position detector and an output of a first-order delay circuit that receives as an input a difference between the motor position detection value obtained from the motor position detector and the driven member position detection value. The speed feedback value is a motor speed detection value calculated by differentiating the motor position detection value obtained from the motor position detector. The control parameter changer includes a divider that calculates the vibration frequency of the constant vibration from the vibration period of the constant vibration, a gain conversion value output unit that uses as an initial value a gain conversion initial value calculated by the vibration frequency of the constant vibration, and sequentially outputs a gain conversion value obtained by repeatedly reducing a predetermined gain decrement each time the constant vibration is detected, and a gain output switcher that performs limit processing on the gain conversion value and changes a gain value by multiplying the gain setting value in the speed command calculator by the gain conversion value.

In another preferred embodiment, the position feedback value is a value obtained by adding the motor position detection value obtained from the motor position detector and an output of a first-order delay circuit that receives as an input a difference between the motor position detection value obtained from the motor position detector and the driven member position detection value. The speed feedback value is a motor speed detection value calculated by differentiating the motor position detection value obtained from the motor position detector. The control parameter changer includes a time constant changer that uses as an initial value the vibration period of the constant vibration, and sequentially updates as a time constant of the first-order delay circuit a value obtained by repeatedly adding a predetermined time constant increment each time the constant vibration is detected. In this case, the control parameter changer preferably also includes a divider that calculates the vibration frequency of the constant vibration from the vibration period of the constant vibration, a gain conversion value output unit that uses as the initial value the gain conversion initial value calculated from the vibration frequency of the constant vibration, and sequentially outputs a gain conversion value obtained by repeatedly reducing a predetermined gain decrement each time the constant vibration is detected, a comparator that determines whether the time constant is equal to or greater than a predetermined reference value, and a gain output switcher that performs limit processing on the gain conversion value when the time constant is equal to or greater than a predetermined reference value and changes the gain value by multiplying the gain setting value in the speed command calculator by the gain conversion value.

In another preferred embodiment, the position control apparatus further includes a differentiator that calculates the motor speed detection value by differentiating the motor position detection value obtained from the motor position detector, and a differentiator that calculates the driven member speed detection value by differentiating the driven member position detection value. The position feedback value is a driven member position detection value detected by the driven member position detector. The speed feedback value is a value obtained by adding the motor speed detection value and an output of a first-order delay circuit that receives as an input a difference between the motor speed detection value and the driven member speed detection value. The control parameter changer includes a divider that calculates the vibration frequency of the constant vibration from the vibration period of the constant vibration, a gain conversion value output unit that uses as an initial value a gain conversion initial value calculated by the vibration frequency of the constant vibration, and sequentially outputs a gain conversion value obtained by repeatedly reducing a predetermined gain decrement each time the constant vibration is detected, and a gain output switcher that performs limit processing on the gain conversion value and changes a gain value by multiplying the gain setting value in the speed command calculator by the gain conversion value.

In another preferred embodiment, the position control apparatus further includes a differentiator that calculates the motor speed detection value by differentiating the motor position detection value obtained from the motor position detector, and a differentiator that calculates the driven member speed detection value by differentiating the driven member position detection value. The position feedback value is a driven member position detection value detected by the driven member position detector. The speed feedback value is a value obtained by adding the motor speed detection value and an output of a first-order delay circuit that receives as an input a difference between the motor speed detection value and the driven member speed detection value. The control parameter changer includes a time constant changer that uses as an initial value the vibration period of the constant vibration, and sequentially updates as a time constant of the first-order delay circuit a value obtained by repeatedly adding a predetermined time constant increment each time the constant vibration is detected. In this case, the control parameter changer preferably includes a divider that calculates the vibration frequency of the constant vibration from the vibration period of the constant vibration, a gain conversion value output unit that uses as an initial value a gain conversion initial value calculated by the vibration frequency of the constant vibration, and sequentially outputs a gain conversion value obtained by repeatedly reducing a predetermined gain decrement each time the constant vibration is detected, a comparator that determines whether the time constant is equal to or greater than a predetermined reference value, and a gain output switcher that performs limit processing on the gain conversion value when the time constant is equal to or greater than a predetermined reference value and changes a gain value by multiplying at least one of the gain setting value of the speed command calculator and the gain setting value of the torque command calculator by the gain conversion value.

With the position control apparatus according to the present invention, it is feasible to accurately detect and suppress low frequency vibrations of the driven member without requiring a large amount of memory and time and without being affected by noise of a detector or the like. Further, it is also feasible to minimize deterioration of following capability of a control system without securing an excessive gain margin even if an impulse-like disturbance is applied.

BRIEF DESCRIPTION OF THE DRAWINGS

A preferred embodiment of the present invention will be described in detail by reference to the following figures, wherein.

DETAILED DESCRIPTION OF EMBODIMENTS OF THE INVENTION

Figure 1:
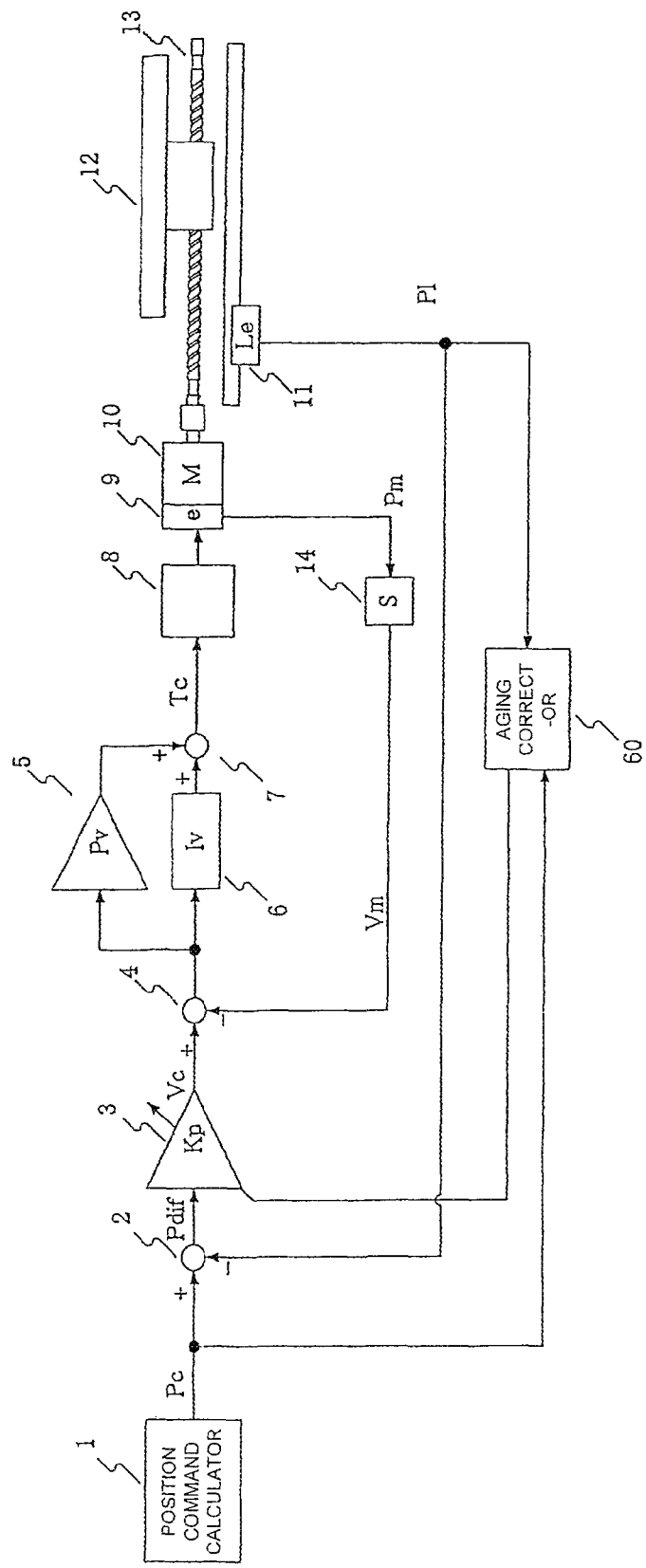
FIG. 1 is a block diagram illustrating an embodiment of the present invention.
Figure 2:
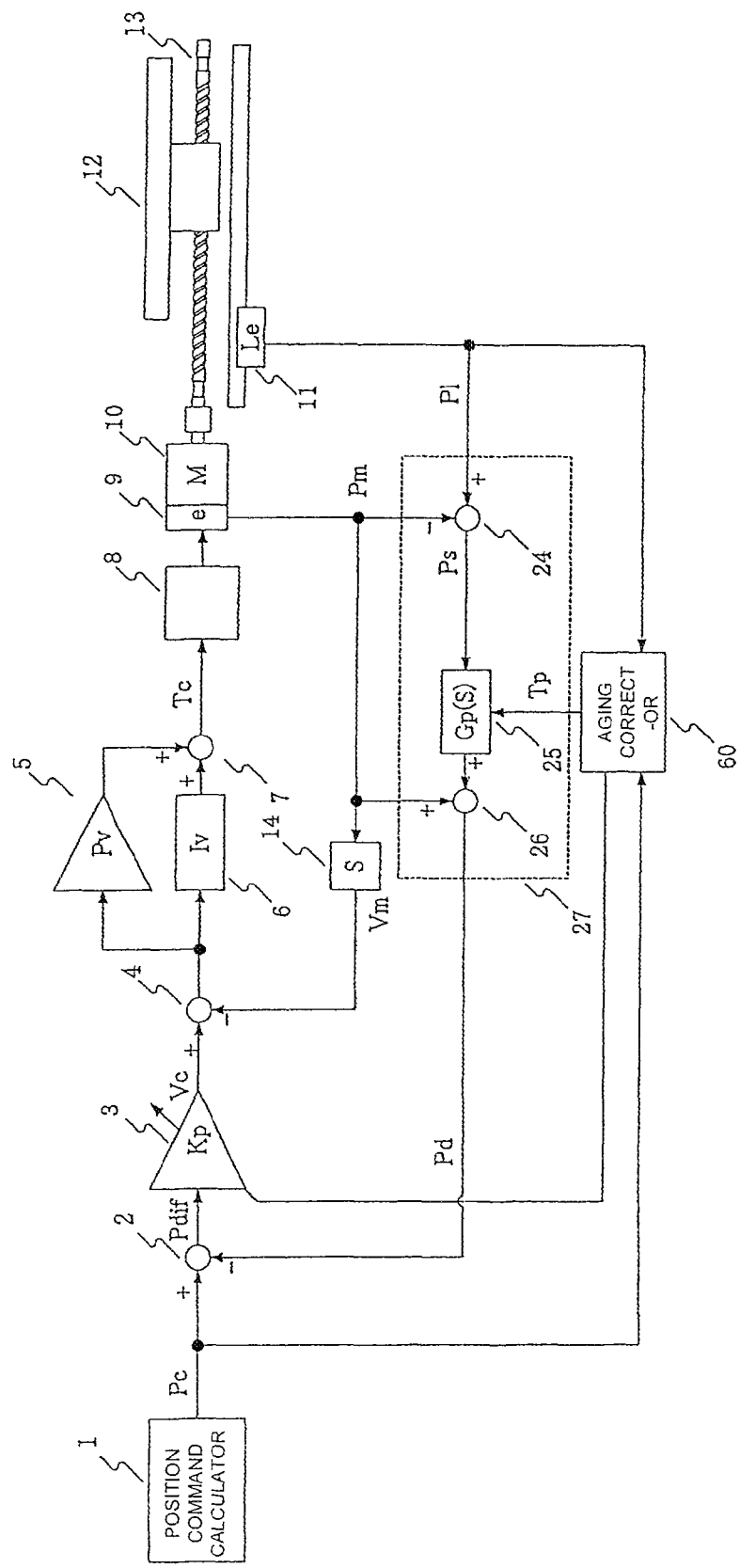
FIG. 2 is a block diagram illustrating an embodiment of the present invention.
Figure 3:
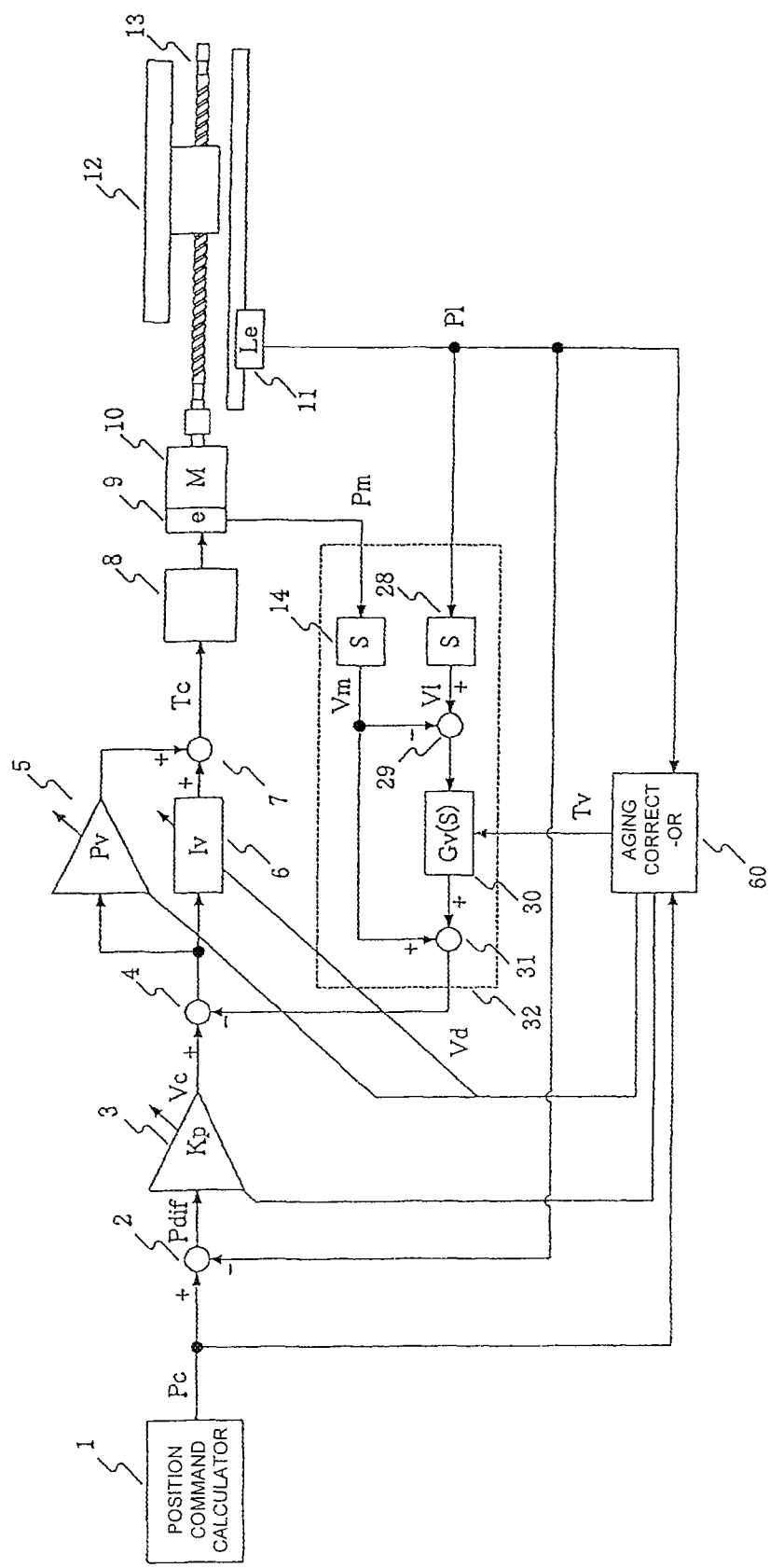
FIG. 3 is a block diagram illustrating an embodiment of the present invention.

An embodiment of the present invention will be described below. Constituent components similar to those illustrated in the conventional example are denoted by the same reference numerals and the descriptions thereof are not repeated. FIGS. 1 to 3 are control block diagrams according to the present invention.

Figure 7:
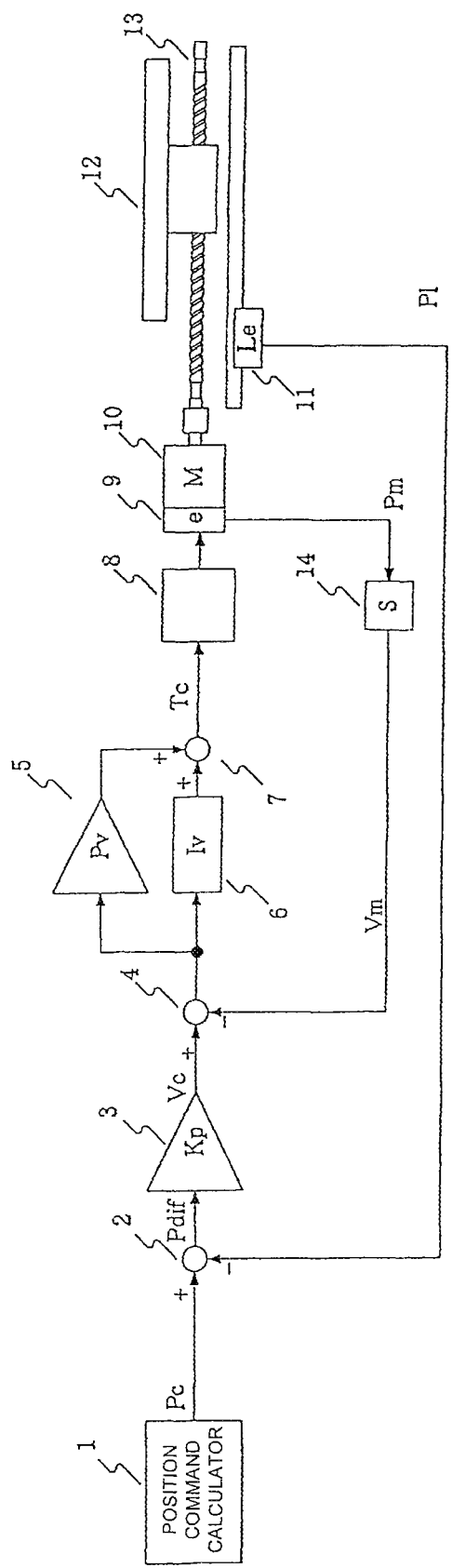
FIG. 7 is a block diagram illustrating a conventional technique.
Figure 8:
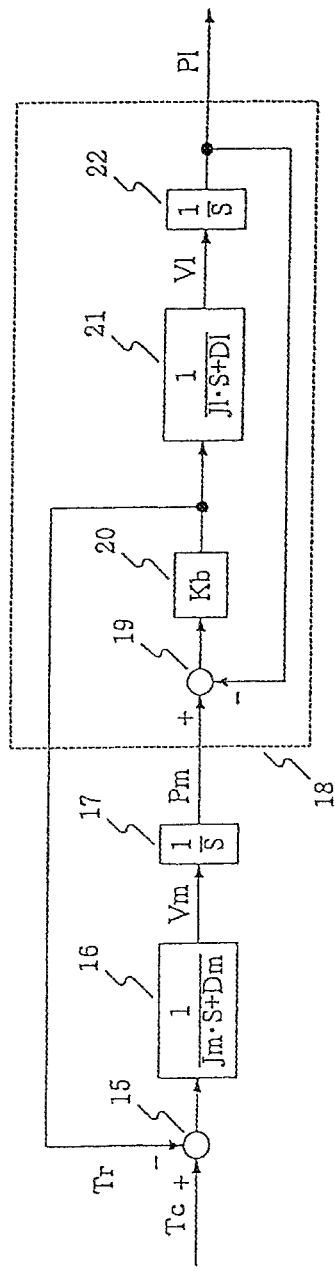
FIG. 8 is a block diagram illustrating an object to be controlled in a two-inertia model.
Figure 9:
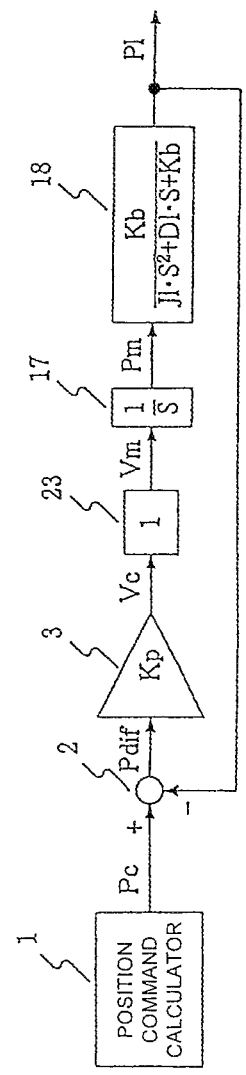
FIG. 9 is a block diagram illustrating a conventional technique.

In FIG. 1, an aging corrector 60 has been added to a conventional example illustrated in FIG. 7. The aging corrector 60 is configured to receive a position command Pc and a driven member position detection value Pl and change a gain Kp of a speed command calculator 3. The aging corrector 60 detects a vibratory state of a driven member when a driving mechanism is not in an acceleration/deceleration state. If a vibratory state of the driven member is detected, the aging corrector 60 reduces the gain Kp of the speed command calculator 3. The aging corrector 60 will be described in detail below.

Figure 10:
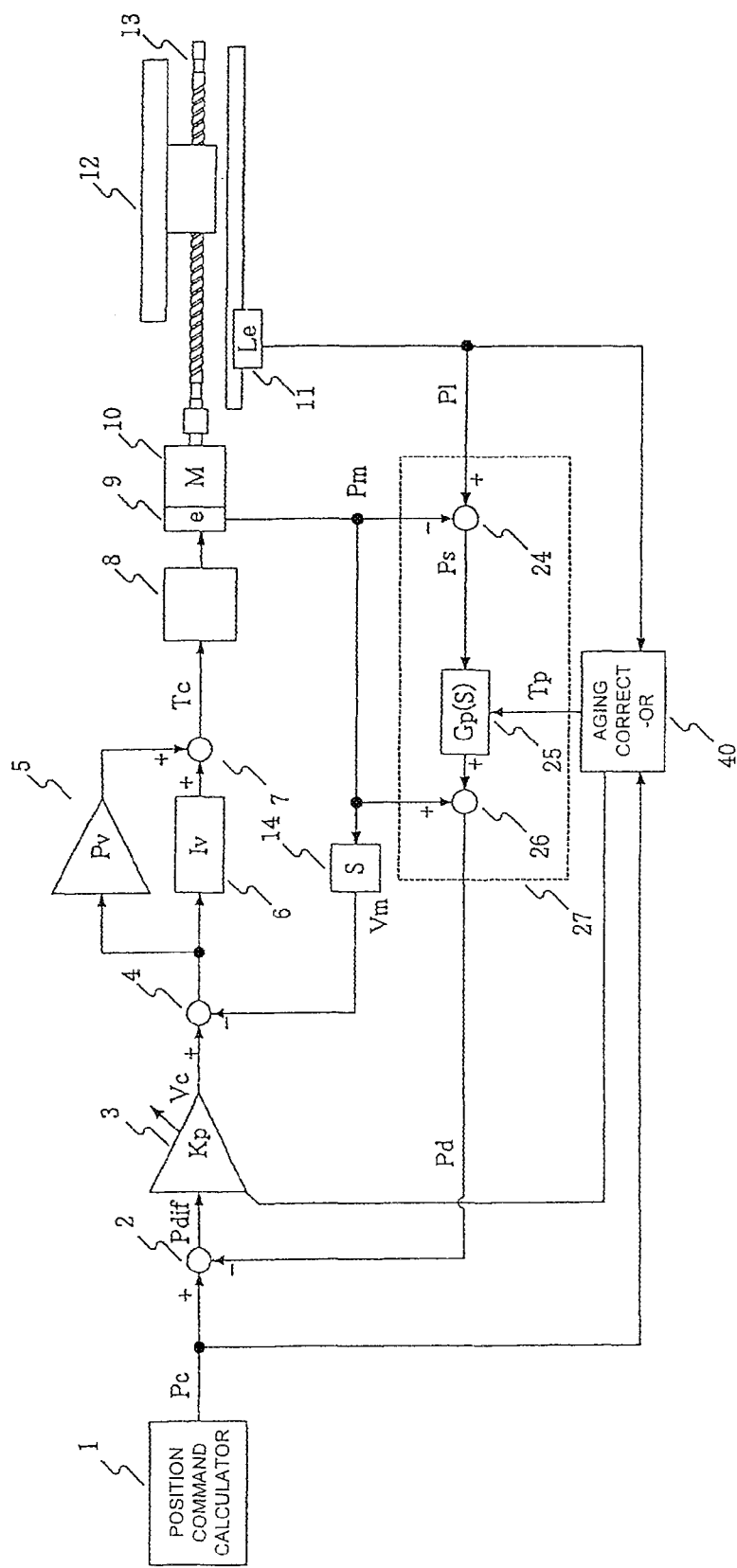
FIG. 10 is a block diagram illustrating a conventional technique.

In FIG. 2, an aging corrector 40 of a conventional example illustrated in FIG. 10 has been replaced by an aging corrector 60. The aging corrector 60 is configured to change a time constant Tp of a first-order delay circuit 25 and a gain Kp of the speed command calculator 3. The aging corrector 60 detects a vibratory state of a driven member when a driving mechanism is not in an acceleration/deceleration state. If a vibratory state of the driven member is detected, the aging corrector 60 increases the time constant Tp of the first-order delay circuit 25 or reduces the gain Kp of the speed command calculator 3. The aging corrector 60 will be described in detail below.

Figure 11:
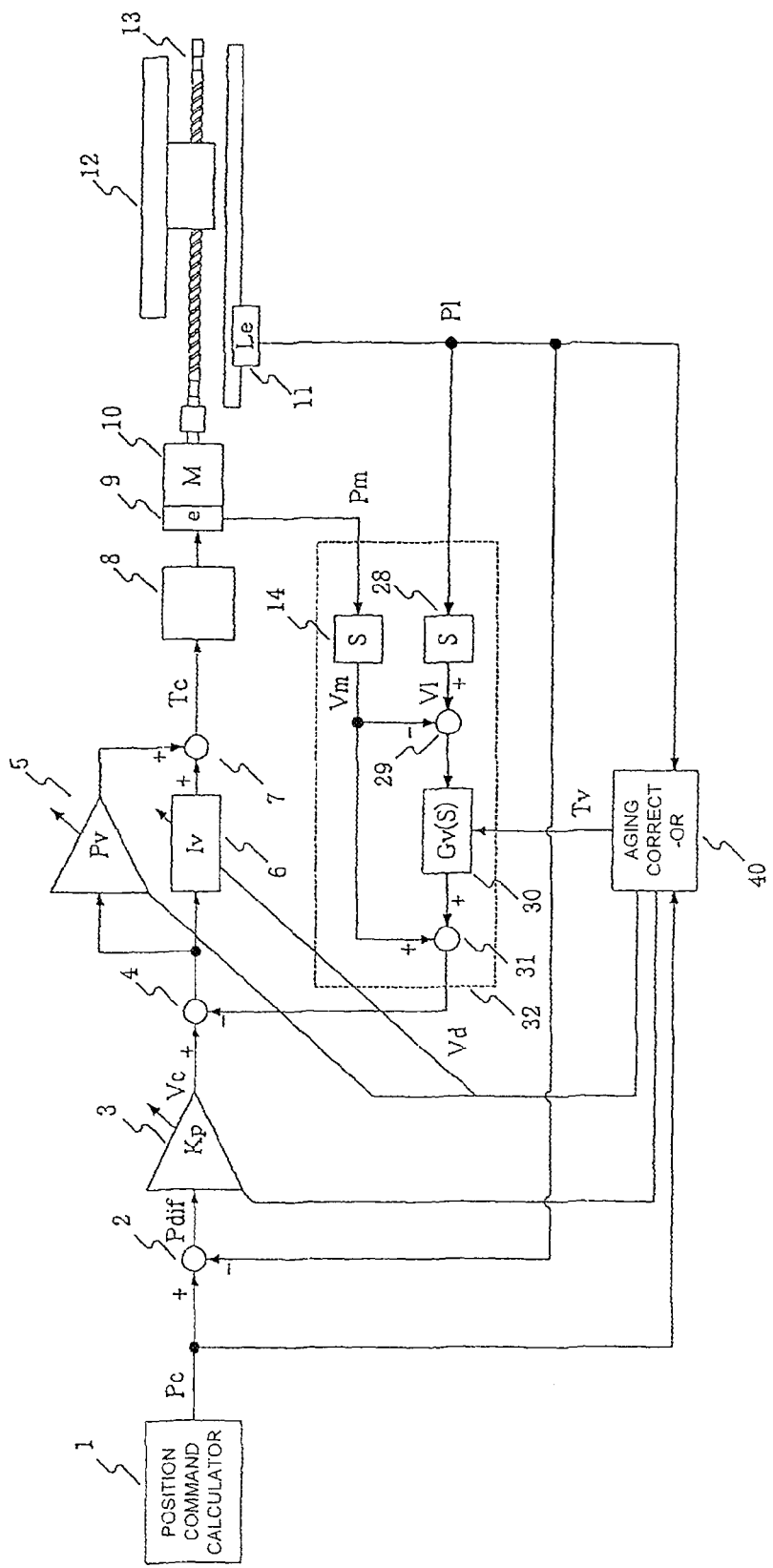
FIG. 11 is a block diagram illustrating a conventional technique.

In FIG. 3, an aging corrector 40 of a conventional example illustrated in FIG. 11 has been replaced by an aging corrector 60. The aging corrector 60 is configured to change a time constant Tv of a first-order delay circuit 30, a gain Kp of the speed command calculator 3, a speed loop proportional gain Pv of a torque command calculator 5, and a speed loop integral gain Iv of a torque command calculator 6. The aging corrector 60 detects a vibratory state of a driven member when a driving mechanism is not in an acceleration/deceleration state. If a vibratory state of the driven member is detected, the aging corrector 60 increases the time constant Tv of the first-order delay circuit 30 or reduces the gain Kp of the speed command calculator 3, the speed loop proportional gain Pv of the torque command calculator 5, and the speed loop integral gain Iv of the torque command calculator 6.

Figure 4:
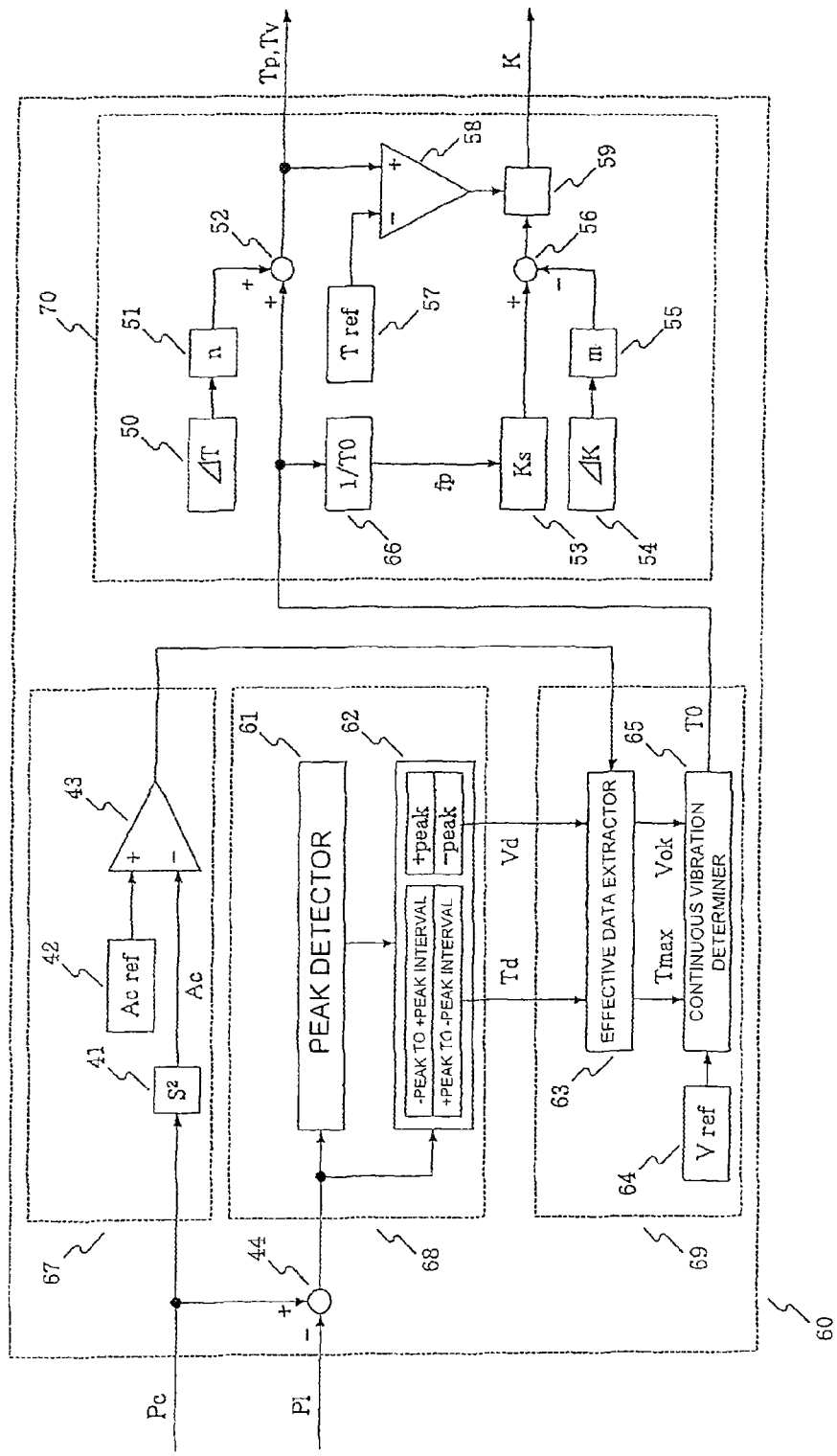
FIG. 4 is a block diagram illustrating an embodiment of the present invention.

Next, the aging corrector 60 is described. FIG. 4 illustrates a structure of the aging corrector 60. A block 67 indicates an acceleration/deceleration state determiner that determines whether a driving mechanism is in an acceleration/deceleration state. More specifically, the position command Pc is input to a second-order differentiator 41 and subjected to second-order differentiation whereby an acceleration command Ac is calculated. A comparator 43 compares the calculated acceleration command Ac with a predetermined acceleration command threshold value Acref. If the acceleration command Ac is equal to or less than the acceleration command threshold value Acref, it is determined that the driving mechanism is not in the acceleration/deceleration state (i.e., is in a stationary state), and a vibration starting signal is output to an effective data comparator 63.

Figure 5:
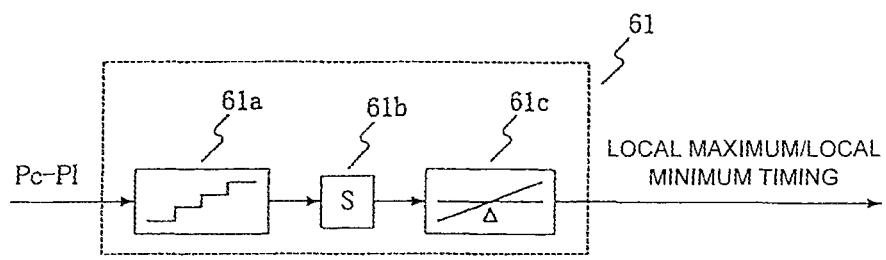
FIG. 5 is a block diagram illustrating an embodiment of a peak detector of the present invention.

A peak detector 61 receives as an input a driven member position error signal that represents a difference between the position command value Pc and the driven member position detection value Pl. The peak detector 61 detects a local maximum timing and a local minimum timing of the driven member position error signal. FIG. 5 illustrates a control block diagram of the peak detector 61. The peak detector 61 receives the driven member position error signal and puts it into a rounding process calculator 61a. The rounding process calculator 61a is designed so that a magnitude equivalent to several times as large as the magnitude of a detector noise included in the driven member position error signal becomes a minimum resolution. The rounding process calculator 61a works to ignore most of the detector noise included in the driven member position error signal. A differentiator 61b differentiates a rounded driven member position error signal to detect a zero-cross timing of the differentiated signals. In this case, the local maximum timing refers to the timing where the polarity of the differentiated signal changes from positive to negative, and the local minimum timing refers to the timing where the polarity of the differentiated signal changes from negative to positive. The local maximum timing and the local minimum timing are output to a memory 62.

When the peak detector 61 detects a local maximum timing, the memory 62 stores a + peak value of the driven member position error signal. The memory 62 also stores a − peak→+ peak interval that represents passage of time after the peak detector 61 has last detected a local minimum timing. In contrast, when the peak detector 61 detects a local minimum timing, the memory 61 stores a − peak value of the driven member position error signal. The memory 61 also stores a + peak→− peak interval that represents passage of time after the peak detector 61 has last detected a local maximum timing.

Each of the − peak→+ peak interval and the + peak→− peak interval is equivalent to half a vibration period of the vibration included in the driven member position error signal. The two values are added together to provide a vibration period detection value Td. The vibration period detection value Td can be replaced by doubling either the − peak→+ peak interval or the + peak→− peak interval.

A difference between the + peak value and the − peak value is equivalent to a vibration amplitude of the vibration included in the driven member position error signal. A vibration amplitude detection value Vd can be obtained by reducing the − peak value from the + peak value. In the case where a constant deviation or the like is not present in the driven member position error signal, the vibration amplitude detection value Vd can be replaced by doubling either the + peak value or the − peak value.

Figure 6:
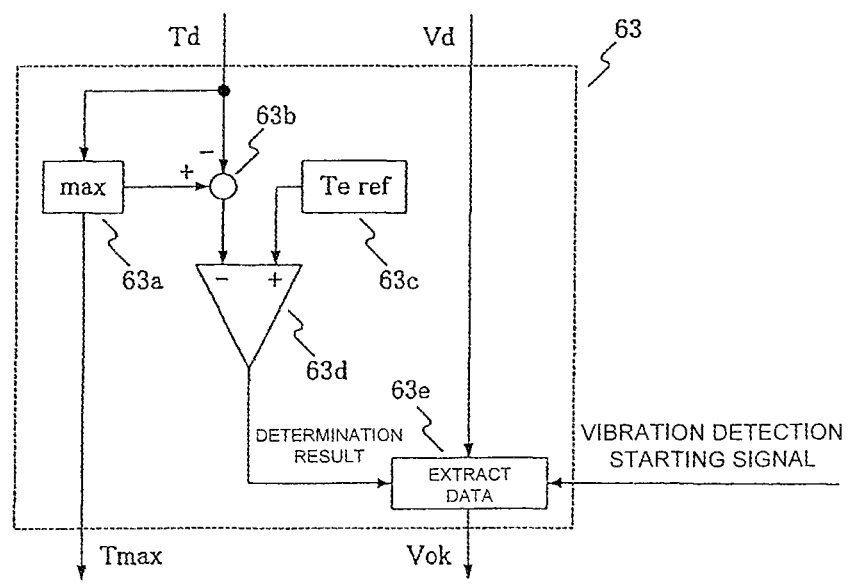
FIG. 6 is a block diagram illustrating an embodiment of an effective data extractor.

The effective data extractor 63 receives as inputs the vibration period detection value Td and the vibration amplitude detection value Vd, which have been calculated in the above. The effective data extractor 63 also receives as an input a vibration detection starting signal output from the comparator 43. The effective data extractor 63 outputs a vibration period maximum value Tmax and a vibration amplitude effective value Vok. FIG. 6 illustrates a control block diagram of the effective data extractor 63. The effective data extractor 63 detects the maximum value of the received vibration period detection value Td and outputs a detection result as the vibration period maximum value Tmax. Meanwhile, the effective data extractor 63 confirms that a difference between the vibration period maximum value Tmax and the vibration period detection value Td is equal to or less than a threshold value Te ref; i.e., the vibration period maximum value Tmax is substantially the same as the vibration period detection value Td. Such confirmation is equivalent to a determination that the vibration period detection value Td is equal to or greater than a period threshold value [Tmax−Te ref]. If the two values are substantially the same and the vibration detection starting signal is being output from the comparator 43, a data extractor 63e outputs the vibration amplitude detection value Vd as the vibration amplitude effective value Vok.

As described above, the detection noise included in the position error signal can be substantially ignored by the rounding process calculator 61a in the peak detector 61. In this case, the rounding process to round-up or round-down lower digits below the limit of the rounding process resolution is carried out. In the vicinity of such a boundary value, the rounding-up and the rounding-down may occasionally be carried out alternately. In this case, the peak detector 61 detects the local maximum/minimum timing caused by noise, other than the local maximum/minimum timing of the vibration that is needed to be suppressed intrinsically. A resulting vibration period detection value Td has an extremely shorter period than the vibration period of the vibration that needs to be suppressed intrinsically.

As described above, when the detection error of the vibration period is caused by noise, the vibration period detection value becomes extremely shorter than the true value. In a situation where the mechanical resonance frequency decreases and low frequency vibrations occur, vibrations having identical periods occur continuously. Even if the vibration period is measured repeatedly, therefore, the resulting measurement value remains substantially the same, and the maximum value thereof also remains substantially the same.

Using this property, the maximum value of the vibration frequency detection value Td can be observed to measure the true value of the vibration period. If the maximum value Tmax of the vibration period is not substantially the same as the vibration frequency detection value Td, it can be determined that the vibration period has been detected erroneously due to the influence of the noise.

If the driving mechanism is in the acceleration/deceleration state, it is not able to properly identify the vibration period because of the presence of various types of variation mode other than the low frequency vibrations to be suppressed.

Thus, the data extractor 63e outputs the vibration amplitude detection value Vd as the vibration amplitude effective value Vok only when it is determined that the driving mechanism is not in the acceleration/deceleration state (i.e., is in the stationary state) and the vibration detection starting signal is output from the comparator 43, and that there is no influence of noise because the maximum period of the vibration period Tmax is substantially the same as the vibration period detection value Td.

Next, a continuous vibration determiner 65 is operated at the output timing of the vibration amplitude effective value Vok obtained from the effective data extractor 63 to carry out a smoothing operation of the vibration amplitude effective value Vok. If a smoothing result exceeds a predetermined vibration amplitude threshold value Vref, constant vibrations occur. That is, the occurrence of the constant vibration is determined. If so determined, the continuous vibration determiner 65 determines the vibration period maximum value Tmax to be the constant vibration period and outputs as the time constant initial value T0 the constant vibration period represented by the vibration period maximum value Tmax. The constant vibration period may be represented by the vibration period detection value Td at the time of determination of the occurrence of the continuous vibrations, instead of the vibration period maximum value Tmax.

The smoothing operation of the vibration amplitude effective value Vok is implemented, for example, by the following calculation, but it is not limited to this method:

$$Y(n)=(1-A)\cdot Y(n-1)+A\cdot U(n) \qquad \text{formula (5)}$$

U(n): input signal (vibration amplitude effective value Vok)
Y(n): output signal
Y(n−1): previous value of the output signal
A: constant [0<A<1]

By smoothing the vibration amplitude effective value Vok as expressed in formula (5), the smoothing result does not immediately exceed the vibration amplitude threshold value Vref even if an impulse-like disturbance is instantaneously applied. It is, therefore, feasible to output the time constant initial value T0 only when the constant vibration occurs, such as during reduction of rigidity of a working part of the feed-axis. Accordingly, the influence of the instantaneous application of the impulse-like disturbance can be suppressed. In the case where the impulse-like disturbance does not work, or can even be ignored according to the machine structure, the smoothing operation does not necessarily have to be carried out on the vibration amplitude effective value Vok, and this and the vibration amplitude effective threshold value Vref may be compared directly.

When the continuous vibration determiner 65 outputs the time constant initial value T0, a control parameter changer 70 changes various control parameters based on the time constant initial value T0 (the constant vibration period) that has been output from the continuous vibration determiner 65. More specifically, as in the conventional example illustrated in FIG. 12, the time constant initial value T0 is set as the initial value of the time constants Tp and Tv used in the first-order delay circuit 25 or 30. If the continuous vibration determiner 65 continuously outputs the time constant initial value T0 even after the time constants Tp and Tv have been updated, the counter 51 starts a count-up operation and adds a predetermined time constant increment ΔT to increase the values of the time constants Tp and Tv by the time constant increment ΔT. The counter 51 and the adder 52, therefore, work as time constant updating units that update the time constants of the first-order delay circuit based on the constant vibration period.

Meanwhile, a divider 66 calculates the vibration frequency fp as the reciprocal of the received the time constant initial value to and outputs the vibration frequency fp. A gain conversion initial value setting unit 53 receives the calculated vibration frequency fp and calculates formula (4) to provide the gain conversion initial value Ks.

The calculated gain conversion initial value Ks is set as an initial value of the gain conversion value K. If the time constant initial value T0 is continuously output from the continuous vibration determiner 65 even after the value of the gain conversion value K has been updated, a counter 55 starts a count-up operation and reduces a predetermined gain decrement ΔK to decrease the gain conversion value K by the gain decrement ΔK. Thus, the gain conversion initial value setting unit 53, the counter 55, and the divider 56 work as a gain conversion output unit that sequentially outputs the gain conversion value. The gain conversion value K is subjected to limit processing in a gain output switcher 59 so that the gain conversion value K falls within the range 0<K<1. If the gain conversion value K is output, the speed command calculator 3 reduces the gain Kp to a value obtained by multiplying the original setting value of the gain Kp by the gain conversion value K in the structure illustrated in FIGS. 1 and 2. Similarly, the speed command calculator 3, the torque command calculator 5 and the torque command calculator 6 reduce the gain Kp, the speed loop proportional gain Pv, and the speed loop integral gain Iv, respectively, by multiplying the original setting values by the gain conversion value K in the structure illustrated in FIG. 3.

Figure 12:
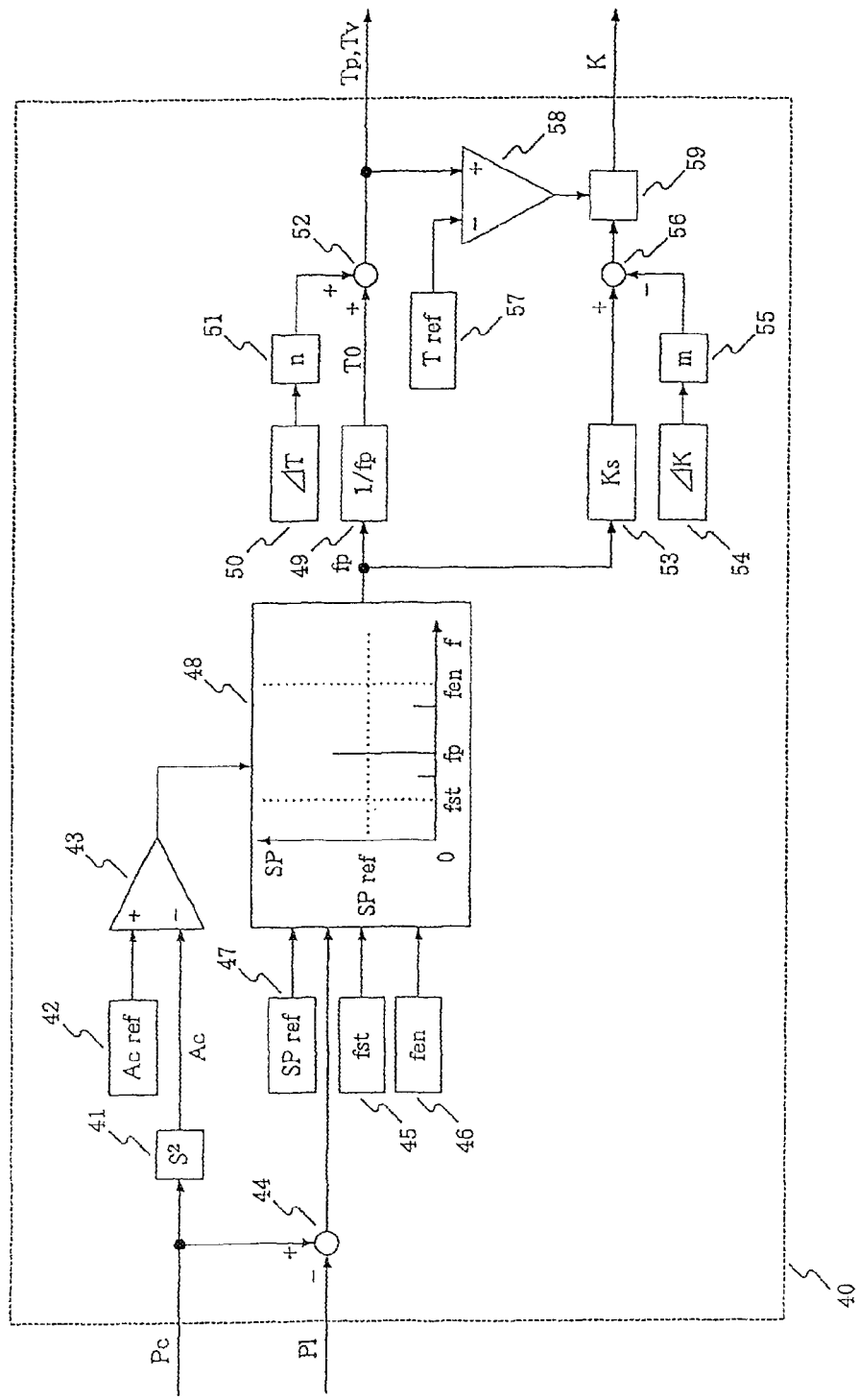
FIG. 12 is a block diagram illustrating a conventional technique.
Figure 13:
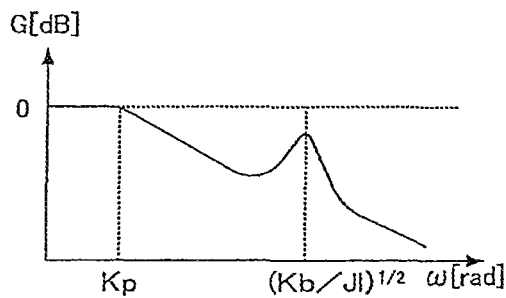
FIG. 13 is a graph illustrating gain characteristics in a state where the mechanical resonance frequency is not reduced.

As in the conventional example illustrated in FIG. 12, it is feasible to prioritize the update of the time constants Tp and Tv rather than the update of the gain conversion value K in the gain output switcher 59. More specifically, a comparator 58 compares the time constants Tp and Tv with a predetermined permissible time constant Tref. As a result of the comparison, if the time constants Tp and Tv exceed the permissible time constant Tref, the gain conversion value K is updated.

Figure 14:
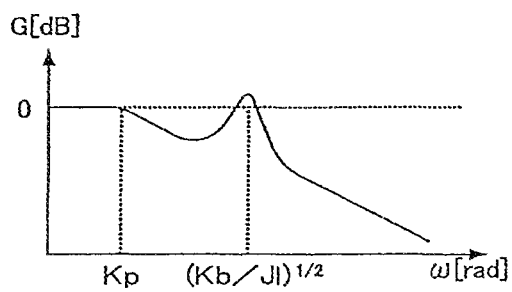
FIG. 14 is a graph illustrating gain characteristics when the mechanical resonance frequency is reduced.
Figure 15:
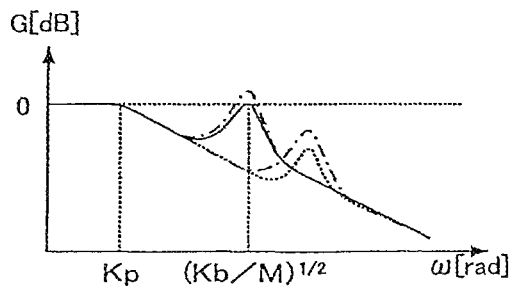
FIG. 15 is a graph illustrating gain characteristics when the time constant of the first-order delay circuit is increased.
Figure 16:
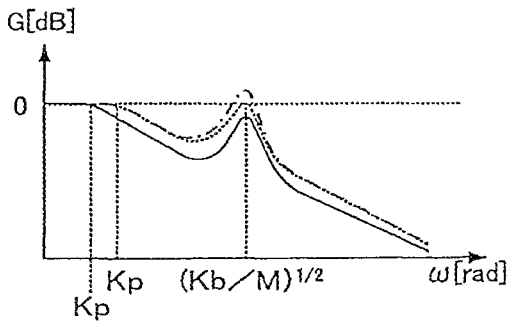
FIG. 16 is a graph illustrating gain characteristics when the time constant of the first-delay circuit is increased and the gain of a speed command calculator is decreased.

As is apparent from the foregoing description, the position control apparatus according to the present invention can increase the values Tp and Tv until after no vibration is observed relative to low frequency vibrations that occur when the mechanical resonance frequency $(Kb/Jl)^{1/2}$ decreases as illustrated in FIG. 14. Alternatively, the position control apparatus can reduce the gain Kp of the speed command calculator 3, the speed loop proportional gain Pv of the torque command calculator 5, and the speed loop integral gain Iv of the torque command calculator 6. Accordingly, the gain margin of the mechanical resonance frequency $(Kb/Jl)^{1/2}$ increases as indicated by the solid lines of FIGS. 15 and 16. Thus, the position control apparatus can stabilize the control system and suppress the occurrence of low frequency vibrations.

It is feasible, then, to significantly reduce the amount of memory used or the time necessary for calculation, because no frequency analyzing method such as DFT (FFT) is used to identify the vibration frequency fp (time constant initial value T0) of the vibration included in the driven member position error signal. Further, the position control apparatus includes the rounding process calculator 61a in the peak detector 61 and also includes the effective data extractor 63. Accordingly, it is feasible to accurately identify the vibration period without erroneously detecting the time constant initial value T0 due to the influence of noise in the detector, etc. Further, the position control apparatus includes the continuous vibration determiner 65 so as to minimize decrease of the following capability of the control system without securing an excessive gain margin, as the time constants Tp and Tv, or the gains Kp, Pv, or Iv are updated when the impulse-like disturbance is instantaneously applied.

What is claimed is:

1. A position control apparatus that includes a motor position detector and a driven member position detector capable of detecting a position of a driven member driven by a motor, and is configured to perform full-closed control for controlling the position of the driven member, the position control apparatus further comprising:
   a speed command calculator configured to output a speed command value by proportionally amplifying a deviation between a position command value input from a host apparatus and a position feedback value;
   a torque command calculator configured to output a torque command value by proportionally and integrally amplifying a deviation between the speed command value and a speed feedback value;
   a driving unit configured to drive the motor in response to the torque command value; and
   an aging corrector configured to detect the presence or the absence of a constant vibration of the driven member based on the position command value and a driven member position detection value detected by the driven member position detector, calculate a vibration period of the constant vibration while the constant vibration occurs, and change a control parameter in response to the vibration period, wherein
   the aging corrector includes
   a vibration period and amplitude detector that detects an extreme value and timing of the extreme value of a difference value between the position command value and the driven member position detection value to detect a vibration period and a vibration amplitude, detected by the vibration period and amplitude detector, included in the difference value based on the detected extreme value and the timing of the extreme value, wherein the vibration period and amplitude detector includes a peak detector that receives a driven member position error signal that represents a difference between the position command value and the driven member position detection value,
   an acceleration/deceleration state determiner configured to determine, based on the position command value, that the driven member is not in an acceleration/deceleration state,
   a constant vibration detector that outputs, as the vibration period of the constant vibration: (a) the detected vibration period or (b) a maximum value of the detected vibration period when (i) the driven member is not in the acceleration/deceleration state, (ii) a difference between the vibration period detected by the vibration period and amplitude detector and the maximum value of the detected vibration period is less than a predetermined threshold value, and (iii) the detected vibration amplitude is equal to or greater than an amplitude threshold value, and
   a control parameter changer configured to change the control parameter according to the vibration period output from the constant vibration detector.

2. The position control apparatus according to claim 1, wherein
   the constant vibration detector is configured to perform a smoothing operation on the amplitude of the vibration detected by the vibration period and amplitude detector while the driven member is not in the acceleration/deceleration state and when the vibration period is equal to or greater than the vibration period threshold value, and configured to determine whether the smoothed amplitude is equal to or greater than the vibration amplitude threshold value.

3. The position control apparatus according to claim 1, wherein
   the position feedback value is the position detection value of the driven member detected by the driven member position detector,
   the speed feedback value is a motor speed detection value calculated by differentiating a motor position detection value obtained from the motor position detector, and
   the control parameter changer includes:
   a divider configured to calculate a vibration frequency of the constant vibration from the vibration period of the constant vibration,
   a gain conversion value output unit configured to use as an initial value a gain conversion initial value calculated by the vibration frequency of the constant vibration, and to sequentially output a gain conversion value obtained by repeatedly reducing a gain based on a predetermined gain decrement each time the constant vibration is detected, and a gain output switcher configured to perform a limit processing on the gain conversion value and to change a gain value by multiplying a gain setting value in the speed command calculator by the gain conversion value.

4. The position control apparatus according to claim 1, wherein the position feedback value is a value obtained by adding a motor position detection value from the motor position detector and an output of a first-order delay circuit configured to receive as an input a difference between the motor position detection value from the motor position detector and the driven member position detection value, the speed feedback value is a motor speed detection value calculated by differentiating the motor position detection value obtained from the motor position detector, and the control parameter changer includes:

a divider configured to calculate a vibration frequency of the constant vibration from the vibration period of the constant vibration, a gain conversion value output unit configured to use as an initial value a gain conversion initial value calculated by the vibration frequency of the constant vibration, and to sequentially output a gain conversion value obtained by repeatedly reducing a predetermined gain decrement each time the constant vibration is detected, and a gain output switcher configured to perform a limit processing on the gain conversion value and to change a gain value by multiplying a gain setting value in the speed command calculator by the gain conversion value.

5. The position control apparatus according to claim 1, wherein the position feedback value is a value obtained by adding a motor position detection value obtained from the motor position detector and an output of a first-order delay circuit configured to receive as an input a difference between the motor position detection value from the motor position detector and the driven member position detection value, the speed feedback value is a motor speed detection value calculated by differentiating the motor position detection value from the motor position detector, and the control parameter changer includes a time constant changer configured to use as an initial value the vibration period of the constant vibration, and sequentially updates as a time constant of the first-order delay circuit a value obtained by repeatedly adding a predetermined time constant increment each time the constant vibration is detected.

6. The position control apparatus according to claim 5, wherein the control parameter changer further includes:

a divider configured to calculate a vibration frequency of the constant vibration from the vibration period of the constant vibration, a gain conversion value output unit configured to use as the initial value the gain conversion initial value calculated from the vibration frequency of the constant vibration, and to sequentially output a gain conversion value obtained by repeatedly reducing a predetermined gain decrement each time the constant vibration is detected, a comparator configured to determine whether the time constant is equal to or greater than a predetermined reference value, and a gain output switcher configured to perform a limit processing on the gain conversion value when the time constant is equal to or greater than a predetermined reference value and to change the gain value by multiplying a gain setting value in the speed command calculator by the gain conversion value.

7. The position control apparatus according to claim 1, further comprising:

a first differentiator configured to calculate a motor speed detection value by differentiating a motor position detection value obtained from the motor position detector, and a second differentiator configured to calculate a driven member speed detection value by differentiating the driven member position detection value, wherein the position feedback value is the driven member position detection value detected by the driven member position detector, the speed feedback value is a value obtained by adding the motor speed detection value and an output of a first-order delay circuit configured to receive as an input a difference between the motor speed detection value and the driven member speed detection value, and the control parameter changer includes a divider configured to calculate a vibration frequency of the constant vibration from the vibration period of the constant vibration, a gain conversion value output unit configured to use as an initial value a gain conversion initial value calculated by the vibration frequency of the constant vibration, and to sequentially output a gain conversion value obtained by repeatedly reducing a predetermined gain decrement each time the constant vibration is detected, and a gain output switcher configured to perform a limit processing on the gain conversion value and to change a gain value by multiplying the gain setting value in the speed command calculator by the gain conversion value.

8. The position control apparatus according to claim 1, further comprising:

a first differentiator configured to calculate a motor speed detection value by differentiating a motor position detection value obtained from the motor position detector, and a second differentiator configured to calculate a driven member speed detection value by differentiating the driven member position detection value, wherein the position feedback value is the driven member position detection value detected by the driven member position detector, the speed feedback value is a value obtained by adding the motor speed detection value and an output of a first-order delay circuit configured to receive as an input a difference between the motor speed detection value and the driven member speed detection value, and the control parameter changer includes a time constant changer configured to use as an initial value the vibration period of the constant vibration, and sequentially updates as a time constant of the first-order delay circuit a value obtained by repeatedly adding a predetermined time constant increment each time the constant vibration is detected.

9. The position control apparatus according to claim 8, wherein
the control parameter changer includes:
   a divider configured to calculate a vibration frequency of the constant vibration from the vibration period of the constant vibration,
   a gain conversion value output unit configured to use as an initial value a gain conversion initial value calculated by the vibration frequency of the constant vibration, and to sequentially output a gain conversion value obtained by repeatedly reducing a predetermined gain decrement each time the constant vibration is detected,
   a comparator configured to determine whether the time constant is equal to or greater than a predetermined reference value, and
   a gain output switcher configured to perform a limit processing on the gain conversion value when the time constant is equal to or greater than a predetermined reference value and to change a gain value by multiplying at least one of a gain setting value of the speed command calculator and a gain setting value of the torque command calculator by the gain conversion value.

* * * * *